Patented June 19, 1928.

1,674,403

UNITED STATES PATENT OFFICE.

LEON LILIENFELD, OF VIENNA, AUSTRIA.

ARTIFICIAL MATERIAL AND PROCESS FOR PRODUCING SAME.

No Drawing. Application filed July 23, 1924, Serial No. 727,802, and in Austria April 4, 1924.

There have hitherto been used for the manufacture of artificial materials either cellulose derivatives which are soluble in aqueous alkalies, or cellulose derivatives insoluble therein but soluble in organic solvents. When substances of the first class are used products are obtained which are insoluble in water but nevertheless swell more or less in contact therewith, and therefore lose in strength. The artificial materials obtained by using substances of the second class, do not suffer from this disadvantage; however, both in respect of their manufacture and of their working up, especially owing to the cost of the solvents, they are much less economical than those obtained by using members of the first class, and furthermore they suffer from the disadvantage that they have no capacity, or only a slight capacity, for absorbing dyestuffs.

The absence of a cellulose derivative whose solutions in aqueous alkalies can be worked for technical products which on contact with water show more strength than those produced from the hitherto known cellulose derivatives soluble in alkali, is therefore regarded as a gap in the artificial material industry.

According to this invention, the disadvantages set forth are overcome by using as the basis in the manufacture of artificial materials a thiourethane (thiocarbamic acid ester or xanthamide) of cellulose, in which at least one hydrogen atom of the amido-group is replaced by an alcohol radical.

From a solution of such a substance in aqueous alkali there may be produced artificial materials which are more resistant towards water, that is to say, they remain stronger in contact with water, than those which can be produced with the aid of the hitherto known cellulose derivatives soluble in alkali, such as viscose.

According to another feature of the invention, solutions of many cellulose-thiourethanes in which at least one hydrogen atom linked to the nitrogen is replaced by an alcohol radical, in other solvents, such as an organic base of acyclic, cyclic, or heterocyclic structure, may successfully be converted into artificial materials, either by merely drying such solutions, or by treating them with suitable coagulating materials. Artificial substances, so produced, possess, in addition to transparency, brilliancy and flexibility, a resistance towards water which in many cases reaches or approaches that of cellulose derivatives (for instance, fatty acid esters, ethers) soluble in organic solvents.

This invention provides for the first time a process which permits the conversion into artificial substances, of an important number of representatives of one and the same class of cellulose compounds by means of two entirely different methods, of which one was hitherto applicable only to cellulose derivatives soluble in alkali and the other only to cellulose derivatives soluble in volatile solvents:—The coagulation of aqueous alkaline solutions on the one hand and the drying or precipitation of solutions in volatile solvents on the other hand.

The parent materials for the process according to the invention may, for instance, be obtained by the process described in my copending application No. 727,805, wherein the said parent materials and the process of making same are claimed. According to the process therein described they may be obtained by acting on a cellulose-xantho-fatty acid (that is to say, the products of the reaction between a cellulose-xanthic acid or cellulose-xanthate and a monohalogen derivative of a fatty acid), or on a salt thereof, with a compound in which at least one hydrogen atom of the ammonia is replaced by an aliphatic or aromatic alcohol radical, and which contains at least one exchangeable hydrogen atom in the ammonia. As parent materials for the process described in the said specification there may be used a cellulose-xantho-fatty acid or a cellulose-xanthate derived from cellulose itself, or from a conversion product or derivative of cellulose, so that according to the parent material selected, there may be obtained thiourethanes of cellulose itself or of a conversion product or derivative of cellulose wherein at least one hydrogen atom linked to nitrogen is replaced by an alcohol radical. Consequently in the specification and claims, the expression thiourethane of cellulose containing at least one alcohol radical linked to nitrogen, includes all such compounds, derived from cellulose itself or from substances belonging to the cellulose group and suitable for the production of said compounds.

The practical application of the two methods mentioned above of carrying out the invention is very simple.

The first method consists in dissolving the cellulose-thiourethane containing at least one alcohol radical linked to the nitrogen in an aqueous alkaline solution and bringing the solution or paste into the form of a desired artificial substance, alone or mixed with one or more softening agents or with another colloid soluble in water or in aqueous alkali or with a filling material or dyestuff or pigment, and either drying or steaming it, or both drying and steaming it, or treating it with a fluid precipitating agent, for example a precipitating agent in the form of a solution, or a precipitating agent in the form of gas, or mist.

The first method (simple drying) arose from the observation that the residues (for instance layers, films, sheets, or the like) obtained by the drying of solutions in dilute aqueous alkalies of most of the said cellulose-thiourethanes can be washed with water even when the drying occurs at a comparatively low temperature, for instance 30° C. If desired the dried objects may be treated before washing with a precipitating agent, for instance with an acid or the like.

The second method (treatment of the solution in an alkali with a precipitating agent) is also very convenient owing to the fact that the precipitating agent may be chosen from a wide range. Even a very weak acid, such as carbonic acid, acetic acid, or the like, a salt, an alcohol, tannic acid, formalin or the like, are sufficient to cause solidification of a shaped solution of one of the said cellulose-thiourethanes. The coagulated objects are then washed and dried in the usual way.

According to another feature of the invention, it is possible to render flexible, or to improve the flexibility of the artificial materials produced with the aid of a solution in aqueous alkali of one or more of the said cellulose-thiourethanes, by exposing them for a short or long period to the action of a suitable volatile solvent, as for instance, aqueous pyridine, in the form of a solution or vapour.

The finished artificial materials may also be subsequently treated with a softening agent such as glycerine, sugar, a syrup, Turkey-red oil, soap or the like, either by soaking them in said agent or in a solution thereof, or by impregnating, spraying or coating them therewith.

The solutions or pastes of the said cellulose-thiourethanes in aqueous alkalies may be worked up in conjunction with the following colloids or softening agents:

Hydrated cellulose or hydro-cellulose soluble in alkali, viscose (cellulose-xanthate), either crude, or purified by any known process, albuminous bodies, proteins, glue (gelatine), amyloid, starch or starch-like substances, dextrin, gums (gum arabic, tragacanth, beet gum or the like), pectic materials, tragasol, resins soluble in alkali, resinous condensation products soluble in alkali and obtained by the condensation of phenols, or aromatic amines, or ureas with aldehydes, shellac, glycerine, di-glycerine, polyglycerine, glycol, sugars and syrups, soaps, fats, compounds of fatty-sulphonic acids with ammonia or with an alkali metal such as Turkey-red oil, and the like.

Owing to their colloidal character, such solutions may also be mixed with water-soluble colloids or softening agents to produce emulsions or suspensions in which the constituents do not separate, or do not separate readily. The solutions or pastes therefore bear an addition of such substances as india rubber, guttapercha, balata, fats, drying or non-drying oils, metallic salts of fatty acids and the like.

The second method according to the invention consists in dissolving the cellulose-thiourethane containing at least one alcohol radical linked to the nitrogen, in a volatile solvent, for example a primary, secondary or tertiary amine of the aliphatic or aromatic series, or a higher amine, or pyridine, or another member of the pyridine group advantageously in the presence of some water or in an aqueous solution of ammonia, bringing the solution or paste into the desired form and either drying it or treating it with a suitable precipitating agent. For this purpose the solution or paste may be used either alone or mixed with another colloid soluble in the said solvent, or with a softening agent, filling material, dyestuff, or pigment. The artificial materials, for instance skins, layers, plates, plastic pieces and the like, which may be obtained by drying such solutions, are (if no filling material or pigment is present) transparent, lustrous and flexible. They exhibit a remarkable resistance towards water. Many of the said cellulose-thiourethanes yield on drying artificial materials which, in respect of their resistance towards water, are equal or not far from being equal to many cellulose-fatty acid-esters or ethers.

The products obtained by precipitation from solutions in organic solvents (for this purpose solvents of comparatively low volatility may also be used, for instance alkylanilines, alkyltoluidines, or aniline) are similar to those obtained by precipitation of the solutions in aqueous alkalies.

To a solution of any of the said cellulose-thiourethanes which is to be treated by drying or by precipitation, there may be added also softening agents, such as camphor or its substitutes, an oil, such as castor oil or linseed oil or a phosphoric acid ester of a phenol or the like. The solution may also be combined with other colloids insoluble in water, such as an alkyl or aralkyl ether of cellulose, rubber, gutta-percha, or the like.

The fact that this invention provides a means for producing artificial materials by precipitation from a solution in aqueous alkali, on the one hand, and the evaporation of a solution in a volatile solvent on the other hand, has the result that the number of artificial materials which may be produced from the cellulose-thiourethanes containing an alcohol residue linked to the nitrogen is very considerable.

They are suitable, for instance, for the following purposes: the production of plastic articles of any description which are to be used as a substitute for celluloid, horn, ebonite, ivory, glass, tortoise shell, wood, or the like; for coatings of paint and lacquer; for the production of improved resins and resin substitutes; for the production of skins (films); for the production of artificial fibres, particularly artificial silk; for the production of adhesives and cements; for the production of printing rollers, hectographic masses and the like; for finishes and coatings of every kind, and the like; for finishing and filling textile fabrics and fibres; as well as for paper-surfacing, paper-finishing or paper sizing; for dressing textile fibres; for the production of waterproof materials; for the production of oil-cloth and oil-cloth substitutes; for the production of artificial leather on textile materials, on paper and with the aid of fleeces; for the production of linoleum substitute and floor-coverings of every kind; for the production of insulating goods; for the production of waterproof and transparent paper (diaphanes, and the like); for the manufacture of lincrusta substitute and waterproof wall papers; for the production of bed sheets; and for the production of tracing cloth and book cloth, and the like.

The expression "artificial materials" used in the specification and in the claims includes all the artificial substances mentioned in the preceding paragraph. The term "artificial material" as used in the following claims is used in the further sense that it is intended thereby to exclude the cellulose-thiourethanes as chemical compounds per se which are claimed elsewhere as such. The term is designed to include matter made from or including cellulose-thiourethanes as distinguished from the mere chemical compounds.

A third method for producing artificial materials according to the invention consists in bringing into the form of an industrial article the product which is obtained by acting with a monohalogen-fatty acid on cellulose-xanthic acid or cellulose-xanthate (viscose), that is to say a cellulose-xantho-fatty acid (cellulose-thion-thiol-carbon-hydroxy-paraffin-monocarboxylic acid), or a reaction mixture containing a cellulose-xantho-fatty acid and then treating the product of this action with an agent which converts the cellulose-xantho-fatty acid into a cellulose-thiourethane containing an alcohol radical linked to the nitrogen.

The following examples illustrate the invention, the parts being by weight:

I. Films.

1. A solution of 6–10 per cent strength of a phenyl-thiourethane (a cellulose-xanthanilide), tolylthiourethane, xylyl-thiourethane, or ethyl-thiourethane of cellulose soluble in alkali, in a caustic soda solution of 1–10 per cent strength is formed into a film on a suitable coating table or by means of a suitable coating machine in known manner by drying and subsequent removal from the support, after which the film is washed with water and dried, or treated with a solution of a salt or acid, washed and dried.

2. A solution as used in Example 1 is distributed in the shape of a layer by means of a suitable hopper and coagulated by a solution of sulphuric acid of 10–20 per cent strength, of acetic acid of 25 per cent strength, of ammonium chloride of 20–30 per cent strength, of tannin of 20 per cent strength, or of formaldehyde of 40 per cent strength, or by any precipitating bath known in the viscose industry, for example by a bath consisting of an acid, a salt and an organic substance such as sugar. The solidified film is then thoroughly washed with water and dried. After or before drying the endless film band may be treated with an aqueous solution of glycerine, for instance, of 10 per cent strength for the purpose of increasing the flexibility.

The films which may be made according to Example 1 or 2 may subsequently be heated or steamed.

3. The films produced according to Example 1 or 2 may when finished be passed through an aqueous solution of pyridine and dried, or they may be kept in a closed chamber for several hours over an aqueous solution of pyridine.

4. 100 parts of a cellulose-xanthanilide or of a cellulose-xanthotoluidide, soluble in aqueous pyridine are dissolved in 80–90 parts of an aqueous solution of pyridine of 70 per cent strength, and the solution is worked into a film on a suitable coating table or by means of a suitable coating machine, by drying and subsequently removing from the support.

5. This differs from Example 4 only in that there is added to the solution an agent imparting softness, as for instance a proportion of 10 per cent of ortho-tricresyl-phosphate, camphor, or castor oil.

6. A solution of a cellulose-xanthacetic acid soluble in aqueous alkali in a solution of aniline of 0.5 per cent strength is worked into a film by drying. The film so obtained is then placed in a solution of aniline in water of 3 per cent strength or in a stronger solution of aniline in alcohol, left therein for 24 hours and then dried, or washed and dried.

II. Artificial fibres, particularly artificial silk and artificial hair.

7. A solution of a cellulose-xanthanilide or of a cellulose-xantho-toluidide as prepared in Example 1 is forced or allowed to flow through a fine orifice into a precipitating bath as referred to in Example 2 and the thread which is formed by precipitation is thoroughly washed with water and dried. The finished thread may be passed through a bath containing aqueous pyridine, or may be treated in a closed chamber with the vapour of an aqueous solution of pyridine.

8. A mixture of 50 parts of viscose (prepared in the usual manner) containing 8 to 12 per cent of cellulose, with 50 parts of a solution of cellulose-xanthanilide or of a cellulose-xantho-toluidide in aqueous alkali prepared as referred to in Example 1 is spun into artificial thread as described in Example 7.

9. A solution of 6–8 per cent strength of a cellulose-xanthanilide or of a cellulose-xantho-toluidide in a caustic soda solution of 1–5 per cent strength is spun through a fine orifice and the emerging thread is dried, for instance in a current of hot air, washed, and dried.

The thread produced according to Examples 7 or 8 or 9 may be subsequently heated or steamed.

10. A solution of a cellulose-xanthanilide or of a cellulose-xantho-toluidide in pyridine as referred to in Example 4 is spun through a fine orifice or nozzle and the emerging thread is either dried or passed through a suitable precipitating bath, for instance, a salt solution, washed and dried.

III. Plastic masses.

11. A solution in pyridine of a cellulose-xanthanilide or of a cellulose-xantho-toluidide as referred to in Example 4, mixed with an agent imparting plasticity, for instance camphor, triphenyl-phosphate, an oil or the like, in the presence or absence of dyestuffs or pigments, is worked into celluloid by kneading the solution at reduced pressure, rolling in a calender and compressing in a block press, in known manner.

IV. Dressing of textile materials.

12. A textile fabric, for instance cotton fabric, is coated in one or more layers on a suitable machine, for instance a padding machine or a spreading machine, with a cellulose-xanthanilide or of a cellulose-xantho-toluidide prepared according to Example 1, either alone or mixed with a filling material such as china clay, zinc white or talc, or with a softening medium, for instance glycerine or Turkey-red oil, and dried. (In cases in which the coating is applied in several layers, it is advisable to dry the material after each application.) After drying, the material is steamed if desired, and either washed and dried or introduced into a precipitating bath as referred to in Example 2, washed and dried. Before and after the final drying the textile material may be treated with a softening agent, for instance a soap solution, an aqueous solution of Turkey-red oil, or an aqueous solution of glycerine. The finished product may then, if desired, be passed through a bath containing aqueous pyridine, or treated with vapour of aqueous pyridine.

The finished or coated textile material may, when completed, also be smoothed, calendered, pressed by subjecting them to the action of riffled or patterned rollers, to give them a pattern or a glaze.

V. Artificial leather.

13. The solution of a cellulose-xanthanilide or of a cellulose-xantho-toluidide in pyridine as referred to in Example 4, is mixed with 5 to 8 per cent, reckoned on the solvent, of castor oil or ortho-tricresyl-phosphate and, if desired, with a pigment, for instance soot, ochre, a lake or suitable dyestuff. A suitable textile fabric is then provided with one or more coatings of the mixture on a spreading machine. The dried artificial leather is then calendered and, if desired, grained by embossing.

VI. Book cloth.

14. A conveniently porous textile material, such as calico, is provided with one or more coats of a solution of cellulose-xanthanilide or of a cellulose-xantho-toluidide in caustic soda solution, prepared according to Example 1 and mixed if desired with zinc white, china clay, soot, or finely ground mica, until the pores of the textile fabric are completely filled. If several coats are applied, drying follows each application. The material may be calendered, hot or cold, after each coating, or only after the final coating. After the drying process the fabric so coated or filled is washed, or passed through a precipitating bath as referred to in Example 2, washed and dried.

The finished book cloth may be patterned by pressing between plates, by embossing with patterned rollers or the like, or may be glazed by calendering.

VII. Textile printing.

15. 100 parts of a solution of a cellulose-xanthanilide or of a cellulose-xantho-toluidide as referred to in Example 1 are mixed with 6 to 10 parts of finely ground mica, with 4 parts of lamp black, or with 8 to 10 parts of zinc white and printed on cotton material by means of suitable printing cylinders, if necessary after previously grinding in a colour grinding mill. The printed and dried textile is then washed, if desired after previously steaming for a short time, or treated with a precipitating bath as referred to in Example 2, washed and dried.

The expression "thiourethane with an alcohol radical linked to the nitrogen" in the description and claims, includes thiourethanes (thiocarbamic acid esters, xanthamides) of cellulose, or of conversion products of cellulose (such as cellulose hydrate or hydro-cellulose) or of cellulose derivatives, in which at least one hydrogen atom of the amido group is replaced by an alcohol radical, that is to say, products which may be obtained for instance by acting with a compound derived from ammonia in which at least one hydrogen atom of the ammonia is replaced by an alcohol radical, and in which at least one hydrogen atom of the ammonia is still exchangeable, on a substance or reaction mixture which may be obtained by acting on a cellulose-xanthic acid or on a cellulose-xanthate (viscose) with a monohalogen-derivative of a fatty acid.

The expression "arylthiourethane" includes thiourethanes of cellulose in which a hydrogen atom of the amido-group is replaced by an aryl group, that is to say, for instance, the product of the action of a primary or secondary arylamine on a cellulose-xantho-fatty acid.

The expression "cellulose-xanthanilide" includes thiourethanes of cellulose in which a hydrogen atom of the amido group is replaced by the phenyl radical, that is to say, the product of the reaction of aniline on a cellulose-xantho-fatty acid.

I claim:

1. A process of producing artificial materials which comprises bringing a mixture containing at least one cellulose thiourethane in which at least one hydrogen atom of the amido group is replaced by an alcohol radical and a solvent therefor into the form of an artificial material and thereafter treating it so as to produce separation of solid therefrom.

2. A process of producing artificial materials, which comprises mixing in a suitable solvent therefor at least one cellulose thiourethane in which at least one hydrogen atom of the amido group is replaced by an alcohol radical, bringing the mixture thus obtained into the form of an artificial material and thereafter treating it so as to produce separation of solid therefrom.

3. A process of producing artificial materials, which comprises mixing in a suitable solvent therefor at least one cellulose-aryl-thiourethane, bringing the mixture thus obtained into the form of an artificial material and thereafter treating it so as to produce separation of solid therefrom.

4. A process of producing artificial materials, which comprises mixing in a suitable solvent therefor at least one cellulose thiourethane, bringing the mixture thus obtained into the form of an artificial material and thereafter treating it so as to produce separation of solid therefrom.

5. A process of producing artificial materials, which comprises mixing in a suitable solvent therefor at least one cellulose-aryl-thiourethane and at least one other colloid, bringing the mixture thus obtained into the form of an artificial material and thereafter treating it so as to produce separation of solid therefrom.

6. A process of producing artificial materials, which comprises mixing in a suitable solvent therefor at least one cellulose thiourethane and at least one other colloid, bringing the mixture thus obtained into the form of an artificial material and thereafter treating it so as to produce separation of solid therefrom.

7. A process of producing artificial materials, which comprises mixing in a suitable solvent therefor at least one cellulose-aryl-thiourethane and at least one agent imparting plasticity, bringing the mixture thus obtained into the form of an artificial material and thereafter treating it so as to produce separation of solid therefrom.

8. A process of producing artificial materials, which comprises mixing in a suitable solvent therefor at least one cellulose-thiourethane and at least one agent imparting plasticity, bringing the mixture thus obtained into the form of an artificial material and thereafter treating it so as to produce separation of solid therefrom.

9. Process for producing artificial materials, which comprises bringing an aqueous alkaline solution of a cellulose-thiourethane in which at least one hydrogen atom of the amido group is replaced by an alcohol radical, into the form of an artificial material and treating it with a suitable precipitating agent.

10. Process for producing artificial materials, which comprises bringing an aqueous alkaline solution of a cellulose aryl-thiourethane into the form of an artificial material and treating it with a precipitating agent.

11. Process for producing artificial materials, which comprises bringing an aqueous alkaline solution of a cellulose thiourethane into the form of an artificial material and treating it with a suitable precipitating agent.

12. Process for producing artificial materials, which comprises bringing an aqueous alkaline solution of a cellulose-thiourethane in which at least one hydrogen atom of the amido group is replaced by an alcohol radical and at least one other colloid into the form of an artificial material and treating it with a suitable precipitating agent.

13. Process for producing artificial materials, which comprises bringing an aqueous alkaline solution of a cellulose aryl-thiourethane and at least one other colloid into the form of an artificial material and treating it with a precipitating agent.

14. Process for producing artificial materials, which comprises bringing an aqueous alkaline solution of a cellulose thiourethane and at least one other colloid into the form of an artificial material and treating it with a suitable precipitating agent.

15. Process for producing artificial materials, which comprises bringing an aqueous alkaline solution of a cellulose-thiourethane in which at least one hydrogen atom of the amido group is replaced by an alcohol radical and an agent imparting plasticity into the form of an artificial material and treating it with a suitable precipitating agent.

16. Process for producing artificial materials, which comprises bringing an aqueous alkaline solution of a cellulose aryl-thiourethane and an agent imparting plasticity into the form of an artificial material and treating it with a precipitating agent.

17. Process for producing artificial materials, which comprises bringing an aqueous alkaline solution of a cellulose thiourethane and an agent imparting plasticity into the form of an artificial material and treating it with a suitable precipitating agent.

18. Process for producing artificial materials, which comprises bringing an aqueous alkaline solution of a cellulose-aryl-thiourethane into the form of an artificial material, drying, and washing it.

19. Process for producing artificial materials, which comprises bringing an aqueous alkaline solution of a cellulose thiourethane into the form of an artificial material, drying and washing it.

20. Process for producing artificial materials, which comprises bringing a solution, in a vaporizable material, of a cellulose thiourethane in which at least one hydrogen atom of the amido-group is replaced by an alcohol radical into the form of an artificial material and drying it.

21. Process for producing artificial materials, which comprises bringing a solution of a cellulose-aryl-thiourethane in a vaporizable solvent into the form of an artificial material and drying it.

22. Process for producing artificial materials, which comprises bringing a solution of a cellulose thiourethane in a vaporizable solvent into the form of an artificial material and drying it.

23. Process for producing artificial materials, which comprises bringing a solution in a vaporizable solvent, of a cellulose-thiourethane in which at least one hydrogen atom of the amido-group is replaced by an alcohol radical and at least one agent imparting plasticity into the form of an artificial material and drying it.

24. Process for producing artificial materials, which comprises bringing a solution of a cellulose-aryl-thiourethane in a vaporizable solvent, mixed with at least one agent imparting plasticity, into the form of an artificial material and drying it.

25. Process for producing artificial materials, which comprises bringing a solution of a cellulose thiourethane in a vaporizable solvent, mixed with at least one agent imparting plasticity, into the form of an artificial material and drying it.

26. Process for producing artificial materials, which comprises working up a cellulose thiourethane in which at least one hydrogen atom of the amido group is replaced by an alcohol radical into an artificial material, and steaming the product so obtained.

27. Process for producing artificial materials, which comprises working up a cellulose-thiourethane in which at least one hydrogen atom of the amido group is replaced by an alcohol radical into an artificial material, and heating the product so obtained.

28. Process for producing artificial materials, which comprises working up a cellulose-thiourethane in which at least one hydrogen atom of the amido group is replaced by an alcohol radical into an artificial material, and treating the product so obtained with the vapours of a mixture of a volatile organic solvent with water.

29. As new products, artificial materials which consist of at least one cellulose-thiourethane in which at least one hydrogen atom of the amido group is replaced by an alcohol radical.

30. As new products, artificial materials which consist of at least one cellulose-aryl-thiourethane.

31. As new products, artificial materials which consist of a cellulose thiourethane.

32. As new products, artificial materials which contain as an essential constituent at least one cellulose-thiourethane in which at least one hydrogen atom of the amido group is replaced by an alcohol radical.

33. As new products, artificial materials which contain as an essential constituent at least one cellulose-aryl-thiourethane.

34. As new products, artificial materials which contain as an essential constituent at least one cellulose thiourethane xanthanilide 35. As new products, artificial materials which contain a cellulose-thiourethane in which at least one hydrogen atom of the amido group is replaced by an alcohol radical and an agent imparting plasticity.

36. As new products, artificial materials which contain a cellulose-aryl-thiourethane and an agent imparting plasticity.

37. As new products, artificial materials which contain a cellulose thiourethane and an agent imparting plasticity.

38. As new products, artificial materials which consist of a cellulose compound containing nitrogen and sulphur.

39. As new products, artificial materials which contain a cellulose compound containing nitrogen and sulphur.

40. The process for producing artificial materials which comprises bringing an aqueous alkaline solution, capable of vaporization, of a cellulose thiourethane in which at least one hydrogen atom of the amido group is replaced by an alcohol radical into the form of an artificial material and treating it to cause precipitation.

41. The process for producing artificial material which comprises bringing an aqueous alkaline solution, capable of vaporization, of a cellulose aryl-thiourethane into the form of an artificial material and treating it with an agent to precipitate the aryl-thiourethane.

42. The process for producing artificial materials which comprises bringing a vaporizable aqueous alkaline solution of a cellulose thiourethane into the form of an artificial material and treating it with a precipitating agent.

43. The process for producing artificial materials which comprises bringing a vaporizable aqueous alkaline solution of a cellulose-thiourethane in which at least one hydrogen atom of the amido group is replaced by an alcohol radical and at least one other colloid into the form of an artificial material and treating it with a suitable precipitating agent.

44. The process for producing artificial materials which comprises bringing a vaporizable aqueous alkaline solution of a cellulose aryl-thiourethane and at least one other colloid into the form of an artificial material and treating it with a precipitating agent.

45. The process for producing artificial materials which comprises bringing a vaporizable aqueous alkaline solution of a cellulose thiourethane and at least one other colloid into the form of an artificial material and treating it with a suitable precipitating agent.

46. The process for producing artificial materials which comprises bringing a vaporizable alkaline solution of a cellulose-thiourethane in which at least one hydrogen atom of the amido group is replaced by an alcohol radical and an agent imparting plasticity into the form of an artificial material and treating it with a suitable precipitating agent.

47. The process for producing artificial materials which comprises bringing a vaporizable aqueous alkaline solution of a cellulose-aryl-thiourethane and an agent imparting plasticity into the form of an artificial material and treating it with a suitable precipitating agent.

48. The process for producing artificial materials which comprises bringing a vaporizable aqueous alkaline solution of a cellulose thiourethane and an agent imparting plasticity into the form of an artificial material and treating it with a suitable precipitating agent.

49. The process for producing artificial materials which comprises bringing a vaporizable aqueous alkaline solution of a cellulose-aryl-thiourethane into the form of an artificial material and drying.

50. The process for producing artificial materials which comprises bringing a vaporizable aqueous alkaline solution of a cellulose thiourethane into the form of an artificial material and drying.

51. The process for producing artificial materials which comprises bringing a vaporizable alkaline liquid in admixture with a cellulose thiourethane into the form of an artificial material and drying.

52. The process for producing artificial materials which comprises bringing a vaporizable alkaline liquid in admixture with a cellulose-thiourethane into the form of an artificial material and subjecting it to a precipitation operation.

53. A composition of matter comprising a cellulose-thiourethane and a vaporizable solvent for the cellulose-thiourethane.

54. A composition of matter comprising a cellulose-thiourethane and an alkaline vaporizable solvent.

55. A composition of matter comprising a cellulose-thiourethane and a material selected from the group comprising a hydroxide of an alkali metal, an aliphatic amine, an aromatic amine, pyridine or a member of the pyridine group.

56. A composition of matter comprising a cellulose-thiourethane, water and a material selected from the group comprising a hydroxide of an alkali metal, an aliphatic amine, an aromatic amine, pyridine or a member of the pyridine group.

57. A composition of matter comprising a cellulose-thiourethane in which at least one hydrogen atom of the amido group is replaced by an alcohol radical and an alkaline liquid.

58. A composition of matter comprising a cellulose-thiourethane in which at least one hydrogen atom of the amido group is replaced by an alcohol radical and an agent imparting plasticity.

59. A composition of matter including a cellulose-thiourethane in which at least one hydrogen atom of the amido group is replaced by an alcohol radical and an alkaline agent.

60. A composition of matter including a cellulose-thiourethane in which at least one hydrogen atom of the amido group is replaced by an alcohol radical and an agent imparting plasticity.

61. An artificial material including a cellulose-thiourethane in which at least one hydrogen atom of the amido group is replaced by an alcohol radical.

62. An artificial material formed of a cellulose-thiourethane in which at least one hydrogen atom of the amido group is replaced by an alcohol radical.

In testimony whereof I affix my signature.

LEON LILIENFELD.